US010122871B2

(12) United States Patent
Mihira

(10) Patent No.: US 10,122,871 B2
(45) Date of Patent: Nov. 6, 2018

(54) COMMUNICATION APPARATUS THAT EXECUTES BOTH A FIRST TYPE OF WIRELESS COMMUNICATION AND A SECOND TYPE OF WIRELESS COMMUNICATION, AND CONTROL METHOD FOR COMMUNICATION APPARATUS

(71) Applicant: CANON KABUSHIKI KAISHA, Tokyo (JP)

(72) Inventor: Yoshiro Mihira, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/220,089

(22) Filed: Jul. 26, 2016

(65) Prior Publication Data
US 2017/0034368 A1 Feb. 2, 2017

(30) Foreign Application Priority Data
Jul. 30, 2015 (JP) ................................. 2015-150509

(51) Int. Cl.
| H04N 1/00 | (2006.01) |
| G06F 3/12 | (2006.01) |
| H04W 4/80 | (2018.01) |
| H04W 88/06 | (2009.01) |

(52) U.S. Cl.
CPC ....... *H04N 1/00307* (2013.01); *G06F 3/1204* (2013.01); *G06F 3/1236* (2013.01); *G06F 3/1292* (2013.01); *H04N 1/0044* (2013.01); *H04W 4/80* (2018.02); *H04N 2201/006* (2013.01); *H04N 2201/0075* (2013.01); *H04W 88/06* (2013.01)

(58) Field of Classification Search
None
See application file for complete search history.

(56) References Cited

U.S. PATENT DOCUMENTS

| 9,317,233 | B2 * | 4/2016 | Asai ...................... G06F 3/1236 |
| 2013/0040562 | A1 * | 2/2013 | Song ................... H04M 1/7253 |
| | | | 455/41.1 |
| 2013/0232355 | A1 * | 9/2013 | Okazaki ............... G06F 1/3234 |
| | | | 713/320 |

(Continued)

FOREIGN PATENT DOCUMENTS

JP     2013-157736 A      8/2013

*Primary Examiner* — Thomas D Lee
(74) *Attorney, Agent, or Firm* — Canon U.S.A., Inc. IP Division

(57) ABSTRACT

A communication apparatus that executes a first-type wireless communication and a second-type wireless communication includes a first change unit configured to change, in a case where a predetermined application is activated in the communication apparatus, a setting related to the first-type wireless communication from a first OFF setting indicating that the first-type wireless communication is not executed to a first ON setting indicating that the first-type wireless communication is executed, and a second change unit configured to change, in a case where connection information is acquired using the first-type wireless communication, a setting related to the second-type wireless communication from a second OFF setting indicating that the second-type wireless communication is not executed to a second ON setting indicating that the second-type wireless communication is executed.

11 Claims, 8 Drawing Sheets

(56) References Cited

U.S. PATENT DOCUMENTS

| | | | | |
|---|---|---|---|---|
| 2014/0185097 A1* | 7/2014 | Shiraga | ................ | G06F 3/1292 358/1.15 |
| 2016/0006483 A1* | 1/2016 | Nishi | .................. | H04B 5/0031 455/41.1 |

* cited by examiner

400 SETTING SCREEN

410 SETTING SCREEN

420 SETTING SCREEN

430 SETTING SCREEN

500 PRINT SCREEN

510 PRINT SCREEN

520 PRINT SCREEN

530 PRINT SCREEN

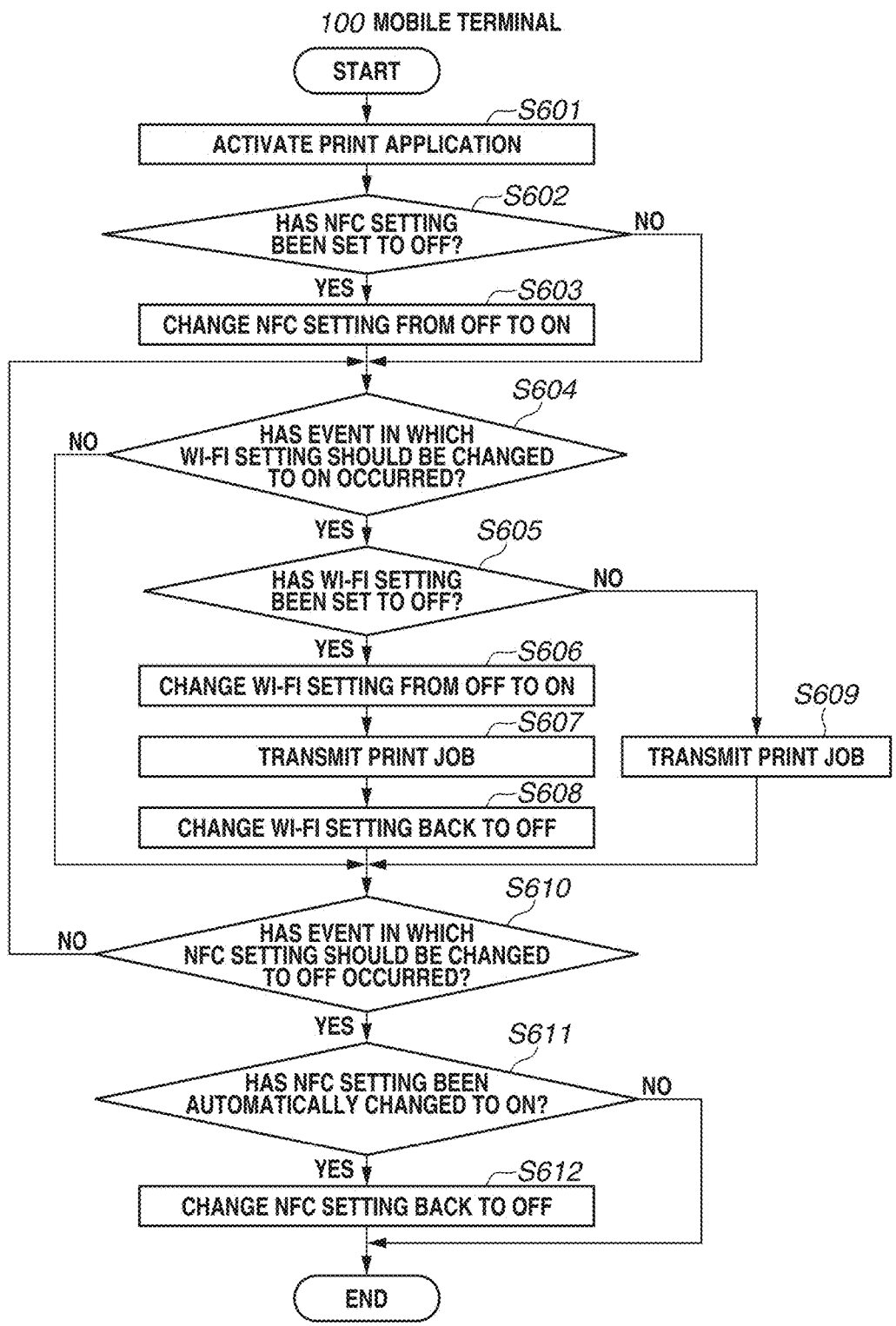

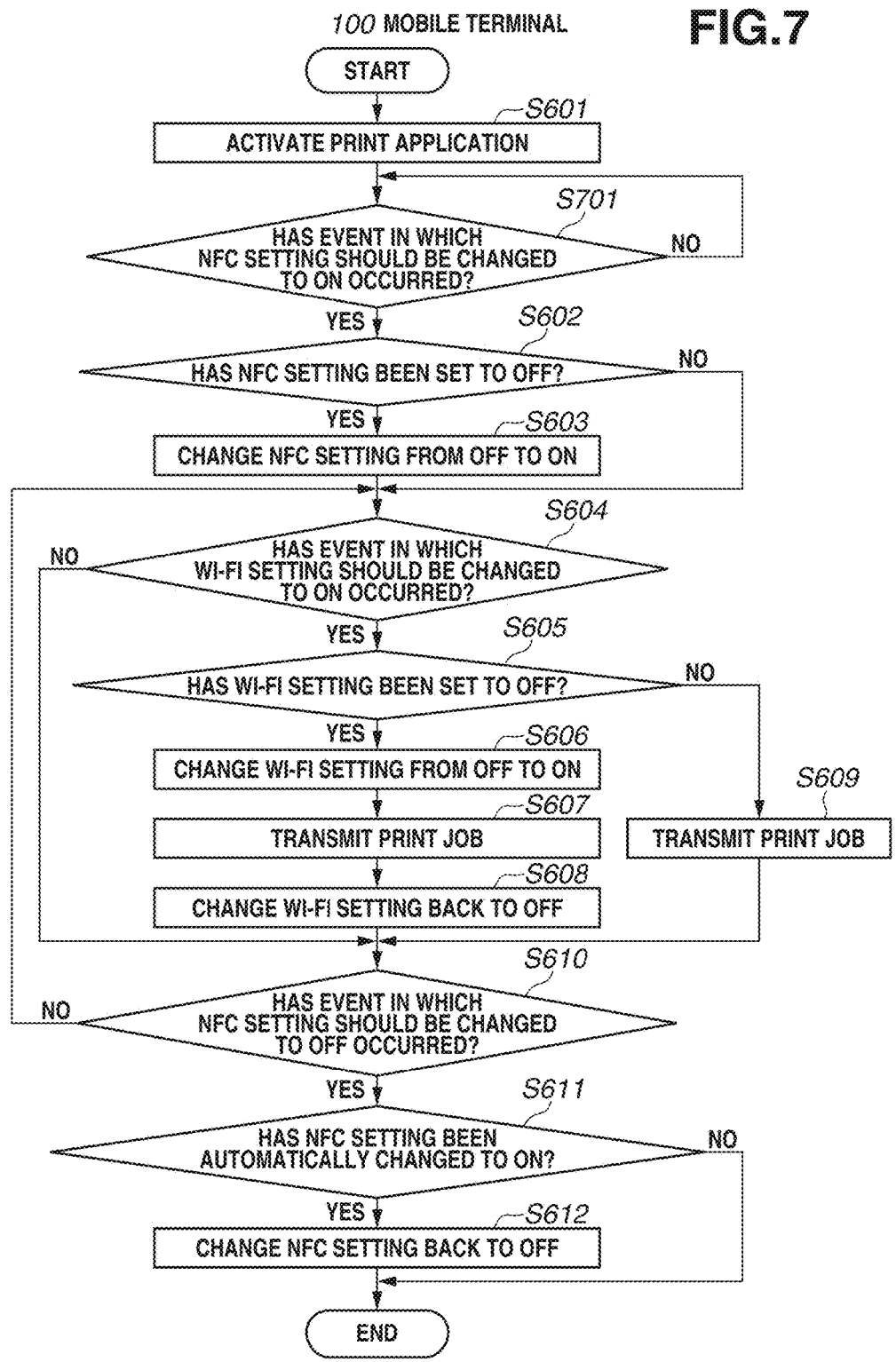

COMMUNICATION APPARATUS THAT EXECUTES BOTH A FIRST TYPE OF WIRELESS COMMUNICATION AND A SECOND TYPE OF WIRELESS COMMUNICATION, AND CONTROL METHOD FOR COMMUNICATION APPARATUS

BACKGROUND

Field

Aspects of The present invention generally relate to a communication apparatus and a control method for the communication apparatus.

Description of the Related Art

Communications apparatuses, such as smartphones and tablet personal computers (PC), include a wireless communication function. Application of the wireless communication function includes, for example, transmitting a picture or an electronic document stored in the communication apparatus to a printer via wireless communication and causing the printer to print the picture or the electric document.

The communication apparatus needs to be connected to an access point to establish wireless communication so that the communication apparatus wirelessly communicates with an external apparatus, such as the printer. Japanese Patent Application Laid-Open No. 2013-157736 discusses handover using near field communication (NFC) as a method for establishing such wireless communication. The term "handover" used herein represents a method by which connection information necessary for execution of wireless communication is acquired using proximity wireless communication such as NFC, and the wireless communication is established based on the acquired connection information. The handover enables wireless communication between a communication apparatus and an external apparatus, such as a printer, to be established if a user simply brings the communication apparatus near the external apparatus or simply touches the external apparatus with the communication apparatus.

The communication apparatus, such as the smartphone and the tablet PC, also has a wireless fidelity (Wi-Fi®) setting to be used for setting whether to use the wireless communication. Moreover, the communication apparatus has an NFC setting to be used for setting whether to use the NFC. In a case where the wireless communication function is used, the user of the communication apparatus sets the Wi-Fi® setting or the NFC setting to ON. On the other hand, in a case where the wireless communication function is not be used, the user sets the Wi-Fi® setting or the NFC setting to OFF to reduce power consumption.

Both the Wi-Fi® setting and the NFC setting of the communication apparatus need not always be set to ON. In some instances, the Wi-Fi® setting or the NFC setting of the communication apparatus can be set to OFF. If the Wi-Fi® setting or the NFC setting is OFF, the handover is not executed, although the user brings the communication apparatus near the printing apparatus. Consequently, wireless communication between the communication apparatus and the printing apparatus is not established.

SUMMARY

According to an aspect of the present invention, a communication apparatus that executes a first-type wireless communication and a second-type wireless communication includes a first change unit configured to change, in a case where a predetermined application is activated in the communication apparatus, a setting related to the first-type wireless communication from a first OFF setting indicating that the first-type wireless communication is not executed to a first ON setting indicating that the first-type wireless communication is executed, and a second change unit configured to change, in a case where connection information is acquired using the first-type wireless communication, a setting related to the second-type wireless communication from a second OFF setting indicating that the second-type wireless communication is not executed to a second ON setting indicating that the second-type wireless communication is executed.

Further features of aspects of the present invention will become apparent from the following description of exemplary embodiments with reference to the attached drawings.

BRIEF DESCRIPTION OF THE DRAWINGS

FIG. 6 is a flowchart illustrating processing executed according to a first exemplary embodiment of the present invention.

FIG. 7 is a flowchart illustrating processing executed according to a second exemplary embodiment of the present invention.

DESCRIPTION OF THE EMBODIMENTS

Figure 1:
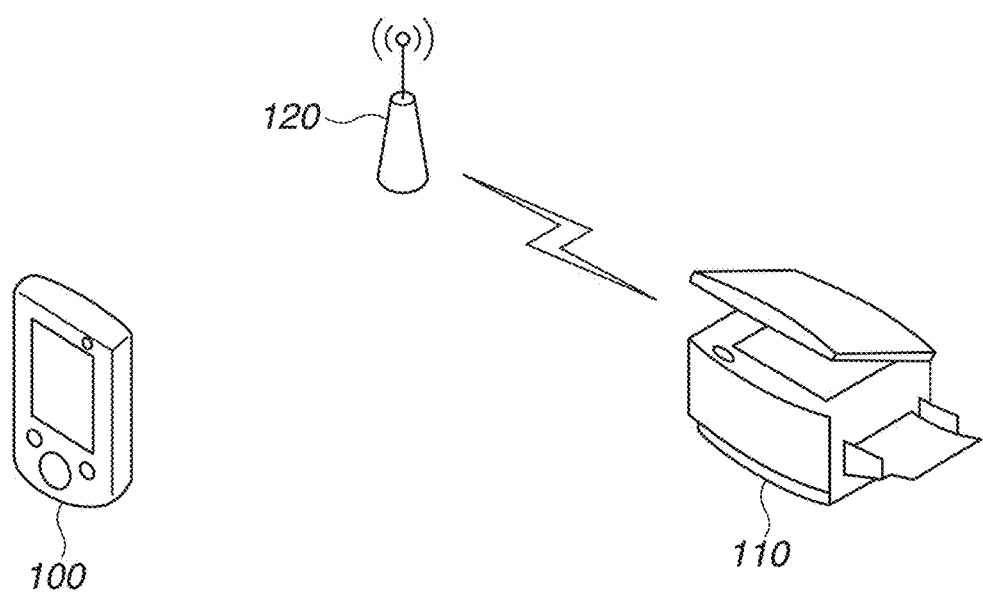
FIG. 1 is a diagram illustrating a configuration of a communication system.

Hereinafter, exemplary embodiments of the present invention are described with reference to the drawings. The following exemplary embodiments are not intended to limit the scope of the claims of the aspects of the present invention, and not all of the combinations of the aspects described according to the following embodiments are necessarily required with respect to implementing the aspects of the present invention.

First, a configuration of a communication system according to a first exemplary embodiment of the present invention is described. The communication system according to the first exemplary embodiment includes a mobile terminal 100, a printing apparatus 110, and an access point 120.

The printing apparatus 110 executes Wi-Fi® based wireless communication with the access point 120. The access point 120 and the printing apparatus 110 can, for example, communicate with each other via wired communication using a local area network (LAN) cable.

The mobile terminal 100 can execute the Wi-Fi® based wireless communication. When a user inputs a service set identifier (SSID) or a security key of the access point 120 to the mobile terminal 100, the mobile terminal 100 is connected to the access point 120. Accordingly, the mobile terminal 100 communicates with the printing apparatus 110 via the access point 120. The mobile terminal 100 can transmit a print job to an external apparatus, such as the printing apparatus 110, via the access point 120. Upon receipt of the print job, the printing apparatus 110 executes printing.

The mobile terminal 100 and the printing apparatus 110 also can execute NFC based proximity wireless communication. In the present exemplary embodiment, the printing apparatus 110 includes an NFC tag in which connection information (the SSID and the security key of the access point 120) for connection to the access point 120 is stored. The mobile terminal 100 acquires the connection information stored in the NFC tag of the printing apparatus 110 by using the NFC so that the mobile terminal 100 can be connected to the access point 120 based on the acquired connection information. Processing for changing the connection to the Wi-Fi® based wireless communication using the connection information acquired by the NFC-based proximity wireless communication is called handover. The use of the handover saves the user from having to input the information (the SSID and the security key of the access point 120) for connection to the access point 120.

The printing apparatus 110 can operate in an access point mode. When operating in the access point mode, the printing apparatus 110 generates an SSID and a security key to serve as an access point. The printing apparatus 110 stores the generated SSID and security key in the NFC tag. When the printing apparatus 110 operates in the access point mode, the mobile terminal 100 and the printing apparatus 110 can execute direct wireless communication without an intervening relay apparatus, such as the access point 120.

Figure 2:
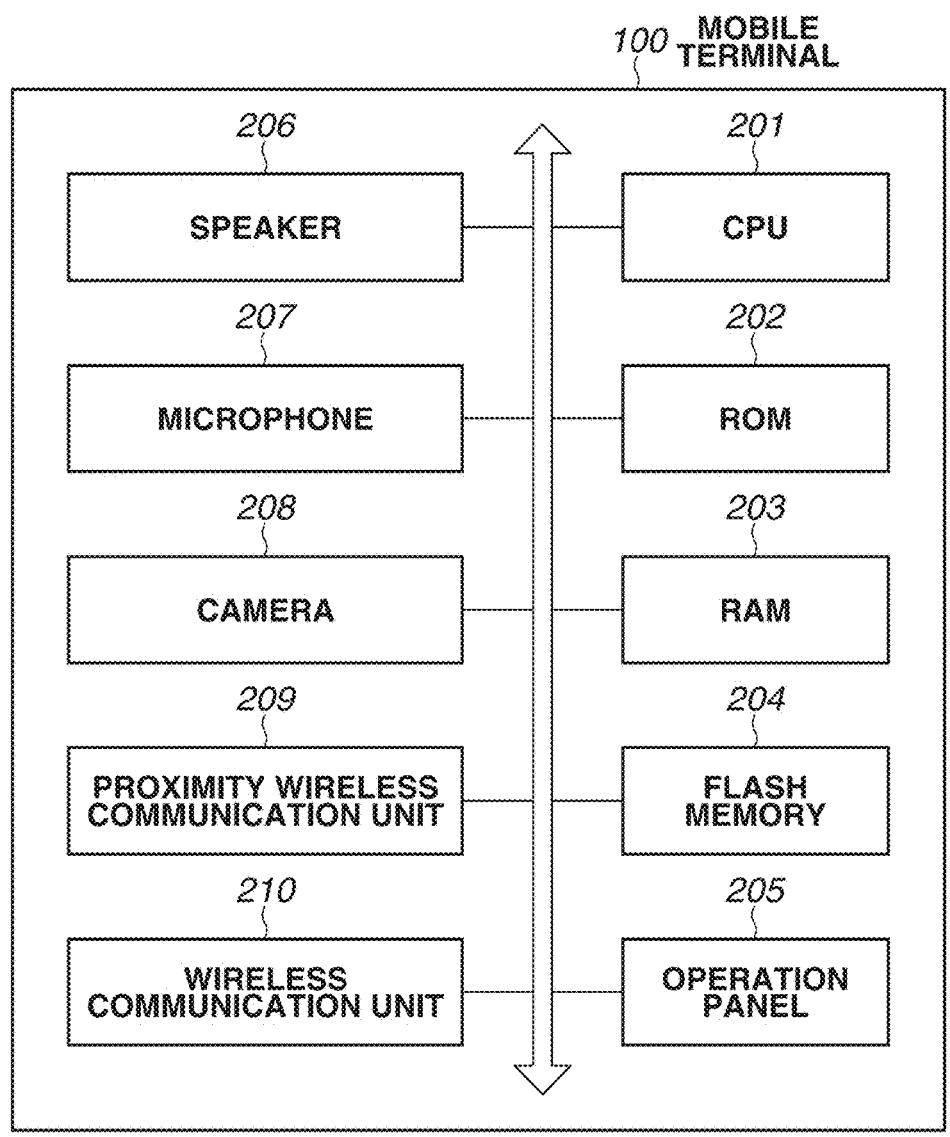
FIG. 2 is a diagram illustrating a hardware configuration of a mobile terminal.

Next, a hardware configuration of the mobile terminal 100 is described with reference to FIG. 2. For description purposes, the mobile terminal 100 of the present exemplary embodiment is considered a smartphone or a tablet PC. However, any communication apparatus capable of executing wireless communication is applicable.

A central processing unit (CPU) 201 reads a control program stored in a read only memory (ROM) 202 to execute various processing for controlling operation of the mobile terminal 100. The ROM 202 stores the control program. A random access memory (RAM) 203 is used as a main memory and a temporary storage area, such as a work area, of the CPU 201. A flash memory 204 is a non-volatile storage medium that stores various data, such as pictures and electronic documents. An operating system (OS) 310 and a print application 300, described below, are stored in the flash memory 204.

In the case of the mobile terminal 100, one CPU 201 executes each processing described below with reference to a flowchart. However, other configurations can be employed. For example, a plurality of CPUs can cooperate with each other to execute each processing of the flowchart described below. Alternatively, a hardware circuit, such as an application specific integrated circuit (ASIC), can be used such that the processing of the flowchart described below is partly executed by the hardware circuit.

An operation panel 205 includes a touch panel function by which a touch operation of a user can be detected, and that displays various screens provided by the OS 310 and the print application 300. The user performs a touch operation on the operation panel 205 so that a desired operation instruction can be input to the mobile terminal 100. The mobile terminal 100 includes a hardware key (not illustrated). The user can also input an operation instruction to the mobile terminal 100 using the hardware key.

A speaker 206 and a microphone 207 are used when the user makes a phone call to another mobile terminal or a fixed-line phone. A camera 208 captures an image (a picture) according to an image capturing instruction from the user. The picture captured by the camera 208 is stored in a predetermined area of the flash memory 204.

A proximity wireless communication unit 209 executes NFC-based proximity wireless communication. In the present exemplary embodiment, the printing apparatus 110 includes an NFC tag. The user brings the mobile terminal 100 near the NFC tag of the printing apparatus 110 so that proximity wireless communication is established between the proximity wireless communication unit 209 and the NFC tag of the printing apparatus 110. Accordingly, the proximity wireless communication unit 209 acquires connection information stored in the NFC tag. The proximity wireless communication executed by the proximity wireless communication unit 209 is not limited to the NFC. For example, Bluetooth® can be used.

A wireless communication unit 210 executes the Wi-Fi® based wireless communication. In the case of the mobile terminal 100, while the operation performed by the user is simple, use of the handover can provide the wireless communication by the wireless communication unit 210. In particular, the connection information (the SSID or the security key of the access point 120) acquired by the proximity wireless communication unit 209 from the NFC tag of the printing apparatus 110 is used so that the wireless communication unit 210 can be connected to the access point 120. In a case where the printing apparatus 110 operates in an access point mode, the SSID generated by the printing apparatus 110 is stored in the NFC tag. Thus, the mobile terminal 100 establishes direct wireless connection with the printing apparatus 110.

Figure 3:
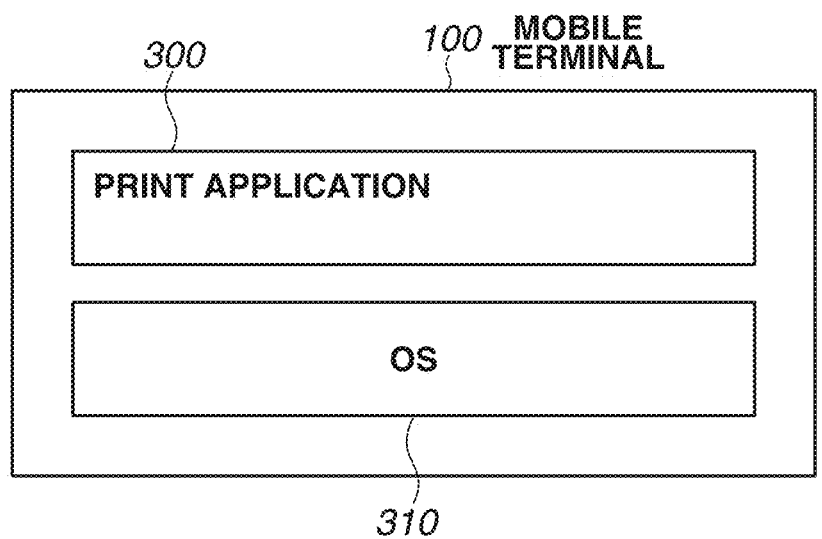
FIG. 3 is a diagram illustrating a software configuration of the mobile terminal.

Next, a software configuration of the mobile terminal 100 is described with reference to FIG. 3. A functional block diagram of FIG. 3 illustrates software implemented when a control program stored in the ROM 202 or the flash memory 204 is read by the CPU 201.

The OS 310 is basic software for comprehensively controlling operations of the mobile terminal 100. In the mobile terminal 100, various applications, including the print application 300, which will be described below can be installed. The OS 310 exchanges information with these applications to change a screen displayed on the operation panel 205 and to control wireless communication performed by the wireless communication unit 210 according to an instruction received from the application.

The print application 300 is an application installed in the mobile terminal 100. In addition to the print application 300, various applications (not illustrated) can be installed in the mobile terminal 100. The print application 300 provides a print function to a user of the mobile terminal 100.

In the mobile terminal 100, the user can set whether to use each of the Wi-Fi® based wireless communication and the NFC-based proximity wireless communication. Such settings are described with reference to FIGS. 4A through 4D.

Figure 4A:
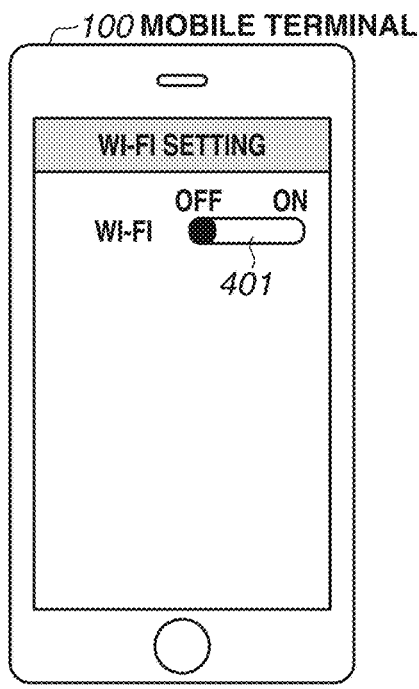
FIGS. 4A and 4B are diagrams each illustrating a setting screen for a wireless fidelity (Wi-Fi) setting.

FIG. 4A illustrates a setting screen 400 provided by the OS 310 and displayed on the operation panel 205. The setting screen 400 is used when the user sets whether to use the Wi-Fi® based wireless communication by using a slide bar 401. In FIG. 4A, the setting screen 400 illustrates a case where an OFF setting inhibiting execution of the Wi-Fi® based wireless communication is selected with the slide bar 401. The setting of the Wi-Fi® based wireless communication is set using the setting screen 400. In the following description, such a setting is called a Wi-Fi® setting.

Figure 4B:
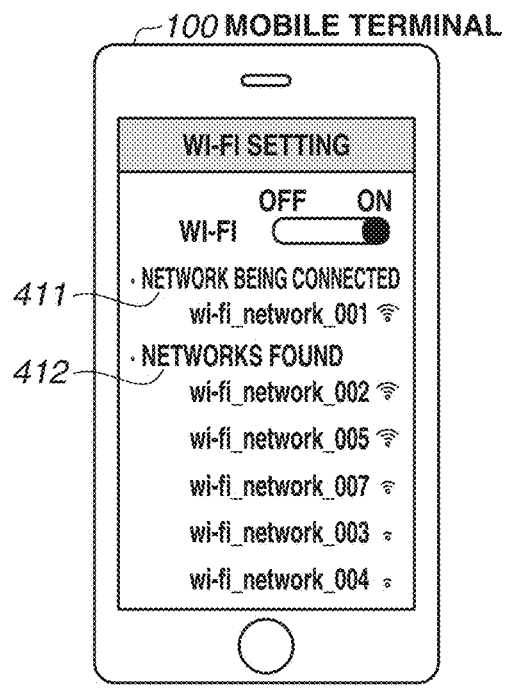

In FIG. 4B, a setting screen 410 illustrates a case where an ON setting enabling execution of the Wi-Fi® based wireless communication is set as a Wi-Fi® setting. The setting screen 410 is provided by the OS 310 and displayed on the operation panel 205.

When the Wi-Fi® setting is set to ON, the wireless communication unit 210 searches for an access point. If an access point the wireless communication unit 210 previously connected to is found, the wireless communication unit 210 is connected to the access point. Alternatively, the wireless communication unit 210 can be connected to an access point designated by the user. An area 411 on the setting screen 410 displays an SSID of the access point to which the mobile terminal 100 is being connected. An area 412 on the setting screen 410 displays a list of SSIDs of access points that have been found by the search.

Figure 4C:
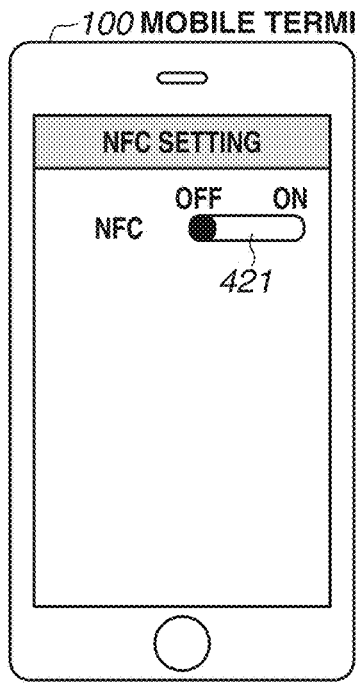
FIGS. 4C and 4D are diagrams each illustrating a setting screen for a near field communication (NFC) setting.

FIG. 4C illustrates a setting screen 420 enabling the user to set, using a slide bar 421, whether to use NFC-based proximity wireless communication. This is referred to as an NFC Setting. The setting screen 420 is provided by the OS 310 and displayed on the operation panel 205. In FIG. 4C, the setting screen 420 illustrates a case where an OFF setting inhibiting execution of the NFC-based proximity wireless communication is selected with the slide bar 421.

Figure 4D:
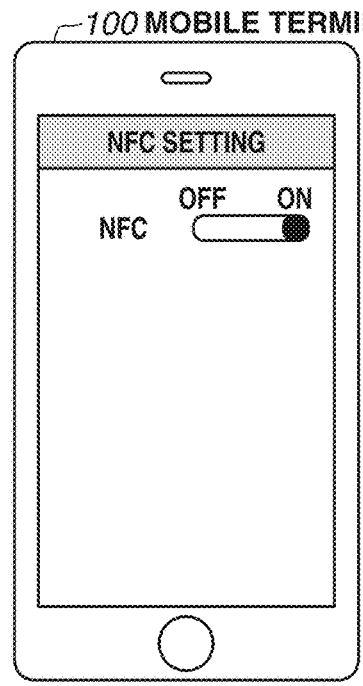

In FIG. 4D, a setting screen 430 illustrates a case where an ON setting enabling execution of the NFC-based proximity wireless communication is set as an NFC setting. The setting screen 430 is provided by the OS 310 and displayed on the operation panel 205.

Accordingly, as illustrated in FIGS. 4A through 4D, the user manually sets the Wi-Fi® and the NFC settings related to a plurality of respective wireless communication types. Moreover, the mobile terminal 100 automatically changes each of the Wi-Fi® setting and the NFC setting at an appropriate timing based on a state of the print application 300. This processing is described in detail below. Moreover, a result of the setting with use of the setting screen described in each of FIGS. 4A though 4D is stored in a storage unit, such as the flash memory 204.

Next, a print function provided by the print application 300 and screen transition of the print application 300 are described with reference to FIGS. 5A through 5D. Each of the screens illustrated in FIGS. 5A, 5B, 5C, and 5D is displayed on the operation panel 205 by the print application 300.

Figure 5A:
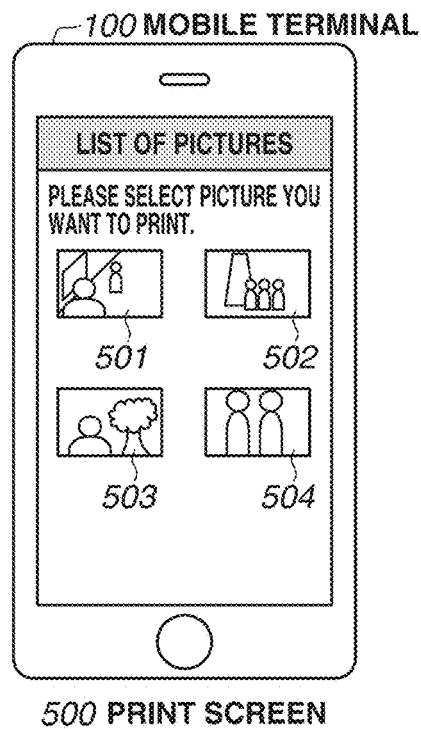
FIGS. 5A, 5B, 5C, and 5D are diagrams illustrating screen transition of a print application.

A print screen 500 illustrated in FIG. 5A displays a list of pictures stored in the flash memory 204. The print screen 500 is initially displayed when the print application 300 is activated. The print screen 500 illustrates an example case where four pictures 501 through 504 are displayed. A user selects a picture intended to be printed using the print screen 500.

The print application 300 determines whether the NFC setting is ON or OFF when the print application 300 is activated. If the NFC setting remains OFF, the connection information necessary for the handover cannot be acquired from the NFC tag. Thus, in the present exemplary embodiment, if the NFC setting is OFF at activation of the print application 300, the print application 300 changes the NFC setting to ON. Specifically, the print application 300 requests the OS 310 to change the NFC setting to ON and OS 310 changes the NFC setting to ON. From a standpoint of the user, since the NFC setting is automatically changed to ON by the print application 300, the user does not need to consider changing the NFC setting, thus enhancing usability.

Figure 5B:
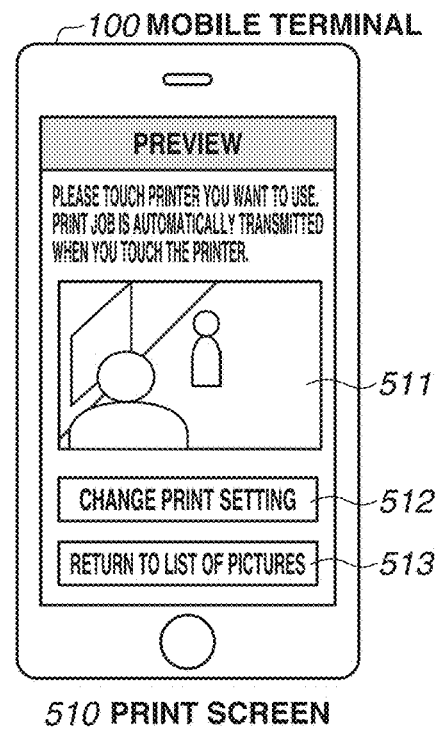
Figure 5C:
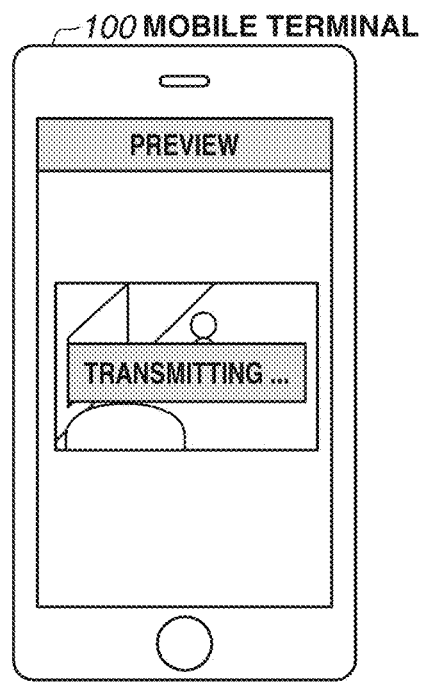
Figure 5D:
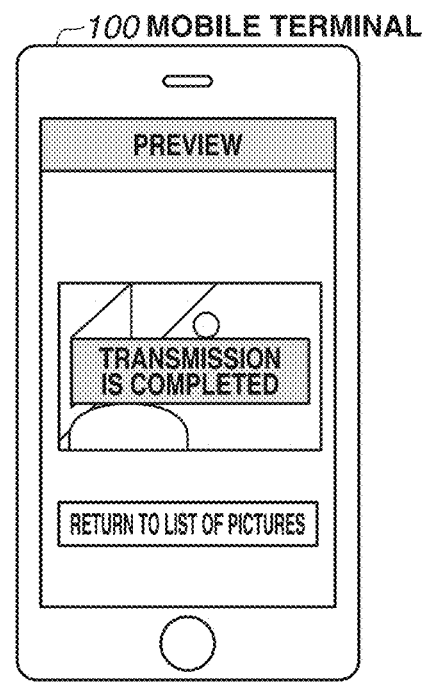

Returning to the print screen 500 illustrated in FIG. 5A, when the user selects a picture from the list of pictures on the print screen 500, a print screen 510 illustrated in FIG. 5B is displayed. The print screen 510 serves as a print preview screen presenting an image (a picture) to be printed. The print screen 510 illustrates an example where the picture 501 is selected. In an area 511, the picture selected from the print screen 500 is enlarged and previewed so that the user can check the selected picture. If the user intends to change the print setting, the user selects icon 512. If the user intends to view the list of pictures (the print screen 500) again, the user selects icon 513.

When the user brings the mobile terminal 100 near the NFC tag of the printing apparatus 110 in a state where the print screen 510 is being displayed, the proximity wireless communication unit 209 reads the information stored in the NFC tag of the printing apparatus 110. The NFC tag of the printing apparatus 110 stores the connection information (the SSID of the wireless communication unit 210, the security key for connection to the access point 120, and an Internet Protocol (IP) address of the printing apparatus 110) needed for the wireless communication unit 210 to wirelessly communicate with the printing apparatus 110.

The mobile terminal 100 can execute the handover using the connection information acquired from the NFC tag. However, in a case where the Wi-Fi® setting is OFF, the wireless communication unit 210 does not execute the Wi-Fi® based wireless communication even if the proximity wireless communication unit 209 acquires the connection information from the NFC tag. In the present exemplary embodiment, the print application 300 changes the Wi-Fi® setting from OFF to ON when the user brings the mobile terminal 100 near the NFC tag That is, when the proximity wireless communication unit 209 acquires the connection information from the NFC tag. More specifically, the print application 300 requests the OS 310 to change the Wi-Fi® setting to ON and OS 310 changes the Wi-Fi® setting to ON. From a standpoint of the user, since the Wi-Fi® setting is automatically changed to ON by the print application 300, the user does not need to consider changing the Wi-Fi setting, thus enhancing usability.

When the proximity wireless communication unit 209 acquires the connection information from the NFC tag, the wireless communication unit 210 is connected to the access point 120, based on the acquired connection information, to establish wireless communication. When the wireless communication unit 210 and the access point 120 are connected, the print application 300 generates a print job for printing the picture being previewed on the print screen 510, and requests the OS 310 to transmit the generated print job to the printing apparatus 110. Upon receipt of the request, the OS 310 transmits the print job to the printing apparatus 110 using the wireless communication unit 210. In this process, the print application 300 displays a print screen 520 illustrated in FIG. 5C on the operation panel 205. When the transmission of the print job is completed, the print application 300 displays a print screen 530 illustrated in FIG. 5D on the operation panel 205.

The mobile terminal 100 executes the processing for automatically changing the Wi-Fi® setting and the NFC setting to ON. This processing is described with reference to a flowchart illustrated in FIG. 6. Each step in the flowchart illustrated in FIG. 6 is executed by the CPU 201 loading the control program stored in a memory, such as the ROM 202, to the RAM 203.

In step S601, when the user inputs an instruction for activation of the print application 300, the CPU 201 activates the print application 300. When the print application 300 is activated, the processing proceeds to step S602, where initial processing of the print application 300 is executed.

In step S602, the print application 300 determines whether an NFC setting has been set to OFF. The processing executed by the print application 300 is implemented by the CPU 201. The print application 300 checks a setting result, stored in the flash memory 204, on the setting screen illustrated in FIGS. 4C and 4D to determine whether the NFC setting has been set to OFF. If the print application 300 determines that the NFC setting has been set to ON (NO in step S602), the processing proceeds to step S604. If the print application 300 determines that the NFC setting has been set to OFF (YES in step S602), the processing proceeds to step S603.

In step S603, the print application 300 changes the NFC setting from OFF to ON. The processing executed by the print application 300 is implemented by the CPU 201. The print application 300 requests the OS 310 to change the NFC setting to ON, and upon receipt of the request, the OS 310 changes the NFC setting from OFF to ON. The processing executed by the OS 310 is implemented by the CPU 201. The NFC setting is changed from OFF to ON so that the mobile terminal 100 can acquire connection information from the NFC tag using the proximity wireless communication unit 209. From a standpoint of the user, since the NFC setting is automatically changed to ON, the user does not need to consider changing the NFC setting, thus enhancing usability.

In step S604, the print application 300 determines whether an event where a Wi-Fi® setting should be changed to ON has occurred. The processing executed by the print application 300 is implemented by the CPU 201. In the present exemplary embodiment, the print application 300 determines occurrence of the event where the Wi-Fi® setting should be changed to ON in a case where the proximity wireless communication unit 209 acquires the connection information from the NFC tag. If the print application 300 determines the occurrence of the event where the Wi-Fi® setting should be changed to ON (YES in step S604), the processing proceeds to step S605. If the print application 300 determines that the event where the Wi-Fi® setting should be changed to ON has not occurred (NO in step S604), the processing proceeds to step S610.

In step S605, the print application 300 determines whether the Wi-Fi® setting has been set to OFF. The processing executed by the print application 300 is implemented by the CPU 201. The print application 300 checks a setting result, stored in the flash memory 204, on the setting screen illustrated in FIGS. 4A and 4B to determine whether the Wi-Fi® setting has been set to OFF. If the print application 300 determines that the Wi-Fi® setting has been set to ON (NO in step S605), the processing proceeds to step S609. If the print application 300 determines that the Wi-Fi® setting has been set to OFF (YES in step S605), the processing proceeds to step S606.

Next, step S606 is described. In step S606, the print application 300 changes the Wi-Fi® setting from OFF to ON. The processing executed by the print application 300 is implemented by the CPU 201. The print application 300 requests the OS 310 to change the Wi-Fi® setting to ON, and upon receipt of the request the OS 310 changes the Wi-Fi® setting from OFF to ON. The processing executed by the OS 310 is implemented by the CPU 201. The Wi-Fi® setting is changed from OFF to ON so that the mobile terminal 100 can establish Wi-Fi® based wireless communication with the access point 120 based on the connection information acquired from the NFC tag. From a standpoint of the user, since the Wi-Fi setting is automatically changed to ON, the user does not need to consider changing the Wi-Fi setting, thus enhancing usability.

In step S607, the print application 300 transmits a print job to the printing apparatus 110. The processing executed by the print application 300 is implemented by the CPU 201. The print application 300 first generates a print job for printing the picture previewed on the print screen 510. The print application 300 then requests the OS 310 to transmit the generated print job to the printing apparatus 110, and upon receipt of the request, the OS 310 transmits the print job to the printing apparatus 110 via the access point 120 using the wireless communication unit 210. The processing executed by the OS 310 is implemented by the CPU 201.

Upon completion of transmission of the print job, the processing proceeds to step S608. In step S608, the print application 300 changes the Wi-Fi® setting back to OFF. The processing executed by the print application 300 is implemented by the CPU 201. The print application 300 requests the OS 310 to change the Wi-Fi® setting to OFF. Upon receipt of the request, the OS 310 changes the Wi-Fi® setting from ON to OFF. The processing executed by the OS 310 is implemented by the CPU 201. In a case where the processing in step S608 is executed, the original Wi-Fi® setting was set to OFF by the user. The execution of the processing in step S608 enables the Wi-Fi® setting back to be changed back to its original OFF setting.

The processing in step S608 has been described using a configuration where the Wi-Fi® setting is changed back to OFF when transmission of the print job is completed. However, the Wi-Fi® setting can be changed back to OFF at a different times. For example, the Wi-Fi® setting can be changed back to OFF on a condition that a next print job is not transmitted for a predetermined time (e.g., five minutes) after transmission of the print job is completed.

Next, step S609 is described. In step S609, the print application 300 transmits a print job to the printing apparatus 110. Since the processing in step S609 is substantially the same as that in step S607, the description thereof is omitted.

Unlike the transmission of the print job in step S607, when the print job is transmitted in step S609, the Wi-Fi® setting remains ON even after transmission of the print job is completed. In a case where the processing in step S609 is executed, the original Wi-Fi® setting was set to ON by the user. Hence, the Wi-Fi® setting remains ON even after the processing in step S609.

Next, step S610 is described. In step S610, the print application 300 determines whether an event where the NFC setting should be changed to OFF has occurred. The processing executed by the print application 300 is implemented by the CPU 201. In the present exemplary embodiment, the print application 300 determines an occurrence of the event where the NFC setting should be changed to OFF in a case where a termination process of the print application 300 is executed. The term "termination process of the print application 300" used herein represents processing executed when the user inputs a termination instruction or when processing executed by the print application 300 is transitioned from foreground processing to background processing in the mobile terminal 100. If the print application 300 determines occurrence of the event where the NFC setting should be changed to OFF (YES in step S610), the processing proceeds to step S611. If the print application 300 determines that the event where the NFC setting should be changed to OFF has not occurred (NO in step S610), the processing returns to step S604.

Next, step S611 is described. In step S611, the print application 300 determines whether the NFC setting automatically changed to ON. The processing executed by the print application 300 is implemented by the CPU 201. If the print application 300 determines that the NFC setting automatically changed to ON (in the exemplary embodiment, the processing executed when the print application 300 activated) (YES in step S611), the processing proceeds to step S612.

In step S612, the print application 300 changes the NFC setting back to OFF. The processing executed by the print application 300 is implemented by the CPU 201. The print application 300 requests the OS 310 to change the NFC setting to OFF, and upon receipt of the request, the OS 310 changes the NFC setting from ON to OFF. The processing executed by the OS 310 is realized by the CPU 201. In a case where the processing in step S612 is executed, the original NFC setting was set to OFF by the user. The execution of the processing in step S612 enables the NFC setting to be set back to the original OFF setting.

If the print application 300 determines that the NFC setting has not automatically changed to ON (NO in step S611), the NFC setting remains ON. Since the user originally set the NFC setting to ON when the print application 300 activated, the NFC setting remains ON.

The NEC setting is changed back to OFF when the termination process of the print application 300 is executed. However, the time when the change occurs is not limited thereto. The NFC setting can be changed back to OFF at a different times. For example, the NFC setting can be changed back to OFF on a condition that the user does not perform an operation with respect to the print application 300 for a predetermined time (e.g., five minutes).

According to the present exemplary embodiment, each of a plurality of wireless communication settings can be automatically changed at an appropriate time based on a state of the application installed in the mobile terminal.

According to the present exemplary embodiment, the NFC setting can be automatically set to ON in preparation for handover when the print application is activated. From a standpoint of the user, since the NFC setting is automatically changed to ON, the user does not need to consider changing the NFC setting, thus enhancing usability.

According to the present exemplary embodiment, the Wi-Fi® setting can be automatically changed to ON when connection information is acquired from the NFC tag. From a standpoint of the user, since the Wi-Fi® setting is automatically changed to ON, the user does not need to consider changing the Wi-Fi setting, thus enhancing usability. The acquisition of the connection information from the NFC tag indicates that the Wi-Fi® based wireless communication is needed. In the present exemplary embodiment, the Wi-Fi® setting is not automatically changed to ON until the connection information is acquired. This reduces an increase in power consumption of the mobile terminal compared to a case where, for example, the Wi-Fi® setting is changed to ON when the print application is activated.

Next, a second exemplary embodiment is described using an example that is a slight modification of the example of the first exemplary embodiment. The first exemplary embodiment was described using an exemplary case where an NFC setting automatically changed to ON when the print application 300 is activated. The present exemplary embodiment is described using an exemplary case where an NFC setting is changed to ON at a different time then when the print application 300 is activated. Since a configuration of a mobile terminal 100 of the present exemplary embodiment is substantially similar to that of the first exemplary embodiment, the description thereof is omitted.

The processing for automatically changing a Wi-Fi® setting and an NFC setting to ON is executed in the mobile terminal 100. This processing is described with reference to a flowchart illustrated in FIG. 7. Each step in the flowchart illustrated in FIG. 7 is executed by a CPU 201 loading a control program stored in a memory, such as a ROM 202, to a RAM 203. In the flowchart illustrated in FIG. 7, processing similar to that illustrated in FIG. 6 is referenced using the same step number as in FIG. 6, and thus, the description thereof is omitted. The description of the flowchart illustrated in FIG. 7 refers to differences with respect to the flowchart illustrated in FIG. 6.

In step S601, when a user inputs an instruction to activate a print application 300, the CPU 201 activates the print application 300. Upon activation, the print application 300 displays a print screen 500 illustrated in FIG. 5A. The processing executed by the print application 300 is implemented by the CPU 201. Unlike the first exemplary embodiment, in the present exemplary embodiment, the print application 300 does not change an NFC setting to ON at an initial state.

In step S701, the print application 300 determines whether an event where the NFC setting should be changed to ON has occurred. The processing executed by the print application 300 is implemented by the CPU 201. In the present exemplary embodiment, the print application 300 determines occurrence of the event where the NFC setting should be changed to ON in a case where the print application 300 displays a specific screen. The term "specific screen" used herein represents a print preview screen, such as the print screen 510 illustrated in FIG. 5B. If the print application 300 determines occurrence of the event where the NFC setting should be changed to ON (YES in step S701), the processing proceeds to step S602. Subsequently, if the print application 300 determines that the NFC setting has been set to OFF (YES in step S602), the processing proceeds to step S603. In step S603, the print application 300 changes the NFC setting from OFF to ON.

If the print application 300 determines that the event where the NFC setting should be changed to ON has not occurred (NO in step S701), the print application 300 waits until occurrence of the event where the NFC setting should be changed to ON.

According to the present exemplary embodiment, the NFC setting can be automatically changed to ON in preparation for handover when a picture of a print target is determined, for example, when a print screen 510 illustrated in FIG. 5B is displayed. From a standpoint of the user, since the NFC setting is automatically changed to ON, the user does not need to consider changing the NFC setting, thus enhancing usability.

Both the first exemplary embodiment and the second exemplary embodiment have been described using an exemplary case where a print application 300 automatically changes a Wi-Fi® setting and an NFC setting. In a third exemplary embodiment, a Wi-Fi® setting and an NFC setting can be changed after confirmation of the change is received from a user, instead of automatically changing.

Figure 8A:
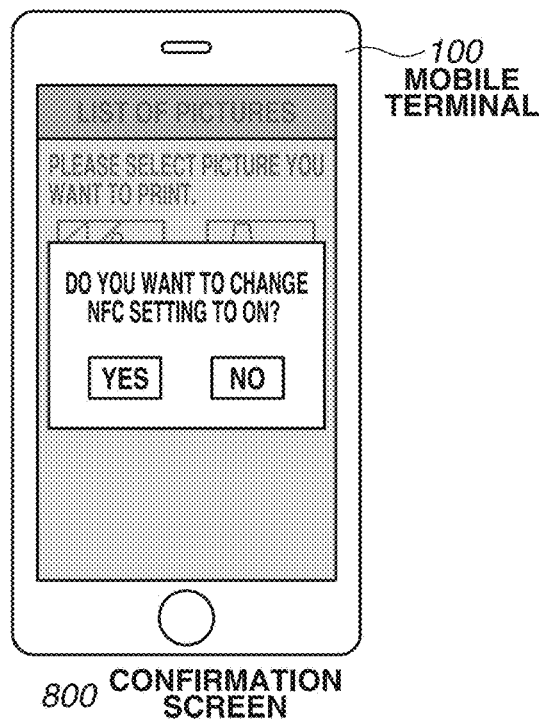
FIGS. 8A and 8B are diagrams illustrating screens for receiving user confirmation of changes of the Wi-Fi setting and the NFC setting, respectively.

FIG. 8A illustrates a confirmation screen 800 displayed by a print application 300 in a case where an event in which an NFC setting should be changed to ON has occurred. The print application 300 can change the NFC setting to ON on a condition that the user selects "Yes" on the confirmation screen 800.

Figure 8B:
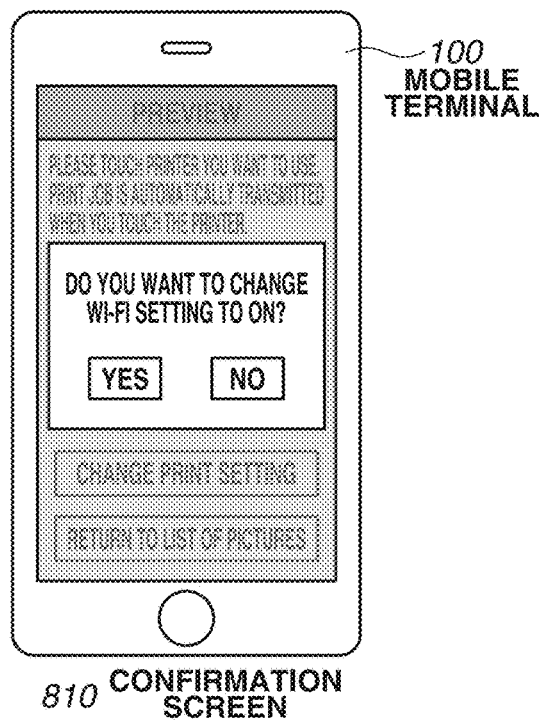

FIG. 8B illustrates a confirmation screen 810 displayed by the print application 300 in a case where an event in which a Wi-Fi® setting should be changed to ON has occurred. The print application 300 can change the Wi-Fi® setting to ON on a condition that the user selects "Yes" on the confirmation screen 810.

In the third exemplary embodiment, a description has been provided of an exemplary case where the print application 300 changes a Wi-Fi® setting and an NFC setting after receiving confirmation of the changes of the Wi-Fi® setting and the NFC setting from a user.

In a fourth exemplary embodiment, a user can manually change a Wi-Fi® setting and an NFC setting. For example, if the user selects "Yes" on a confirmation screen 800 illustrated in FIG. 8A, an OS 310 displays a setting screen 420 illustrated in FIG. 4C. If the user selects "Yes" on a confirmation screen 810 illustrated in FIG. 8B, the OS 310 displays a setting screen 400 illustrated in FIG. 4A.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

This application claims the benefit of Japanese Patent Application No. 2015-150509, filed Jul. 30, 2015, which is hereby incorporated by reference herein in its entirety.

What is claimed is:

1. A communication apparatus comprising:
a memory that stores programs; and
a processor that executes the program to:
receive either one of a first ON setting of allowing execution of proximity wireless communication and a first OFF setting of not allowing execution of the proximity wireless communication, from a user via a setting screen of the communication apparatus provided by an OS operating on the communication apparatus, as a first wireless communication setting corresponding to the proximity wireless communication;
receive either one of a second ON setting of allowing execution of wireless communication and a second OFF setting of not allowing execution of the wireless communication, from the user via a setting screen of the communication apparatus provided by the OS operating on the communication apparatus, as a second wireless communication setting corresponding to the wireless communication;
send a request for change to the OS such that the first wireless communication setting is automatically changed from the first OFF setting to the first ON setting in accordance with activation of a predetermined application in the communication apparatus; and
send a request for change to the OS such that the second wireless communication setting is automatically changed from the second OFF setting to the second ON setting in accordance with acquisition of connection information including an SSID by the proximity wireless communication,
wherein data communication with a connection destination indicated by the SSID is performed by the wireless communication.

2. The communication apparatus according to claim 1, wherein, when the processor executes the program, the processor changes the second wireless communication setting automatically from the second ON setting back to the second OFF setting in accordance with completion of the data communication.

3. The communication apparatus according to claim 1, wherein, when the processor executes the program, the processor changes the second wireless communication setting automatically from the second ON setting back to the second OFF setting in accordance with next data communication not occurring for a predetermined period of time after completion of the data communication.

4. The communication apparatus according to claim 1, wherein, when the processor executes the program, the processor changes the first wireless communication setting automatically from the first ON setting back to the first OFF setting in accordance with execution of a termination process of the predetermined application.

5. The communication apparatus according to claim 1, wherein the proximity wireless communication is communication based on near field communication (NFC).

6. A control method for a communication apparatus, the control method comprising:
receiving either one of a first ON setting of allowing execution of proximity wireless communication and a first OFF setting of not allowing execution of the proximity wireless communication, from a user via a setting screen of the communication apparatus provided by an OS operating on the communication apparatus, as a first wireless communication setting corresponding to the proximity wireless communication;
receiving either one of a second ON setting of allowing execution of wireless communication and a second OFF setting of not allowing execution of the wireless communication, from the user via a setting screen of the communication apparatus provided by the OS operating on the communication apparatus, as a second wireless communication setting corresponding to the wireless communication;

sending a request for change to the OS such that the first wireless communication setting is automatically changed from the first OFF setting to the first ON setting in accordance with activation of a predetermined application in the communication apparatus; and sending a request for change to the OS such that the second wireless communication setting is automatically changed from the second OFF setting to the second ON setting in accordance with acquisition of connection information including an SSID by the proximity wireless communication, wherein data communication with a connection destination indicated by the SSID is performed by the wireless communication.

7. The control method according to claim 6, further comprising changing the second wireless communication setting automatically from the second ON setting back to the second OFF setting in accordance with completion of the data communication.

8. The control method according to claim 6, further comprising changing the second wireless communication setting automatically from the second ON setting back to the second OFF setting in accordance with next data communication not occurring for a predetermined period of time after completion of the data communication.

9. The control method according to claim 6, further comprising changing the first wireless communication setting automatically from the first ON setting back to the first OFF setting in accordance with execution of a termination process of the predetermined application.

10. The control method according to claim 6, wherein the proximity wireless communication is communication based on near field communication (NFC).

11. A non-transitory computer-readable storage medium storing a program that, when executed, causes a communication apparatus to perform a process, the process comprising:

receiving either one of a first ON setting of allowing execution of proximity wireless communication and a first OFF setting of not allowing execution of the proximity wireless communication, from a user via a setting screen of the communication apparatus provided by an OS operating on the communication apparatus, as a first wireless communication setting corresponding to the proximity wireless communication;

receiving either one of a second ON setting of allowing execution of wireless communication and a second OFF setting of not allowing execution of the wireless communication, from the user via a setting screen of the communication apparatus provided by the OS operating on the communication apparatus, as a second wireless communication setting corresponding to the wireless communication;

sending a request for change to the OS such that the first wireless communication setting is automatically changed from the first OFF setting to the first ON setting in accordance with the communication apparatus displaying a predetermined screen; and sending a request for change to the OS such that the second wireless communication setting is automatically changed from the second OFF setting to the second ON setting in accordance with acquisition of communication information including an SSID by the proximity wireless communication, wherein data communication with a connection destination indicated by the SSID is performed by the wireless communication.

* * * * *